(12) United States Patent
Terada et al.

(10) Patent No.: US 12,724,861 B2
(45) Date of Patent: Sep. 1, 2026

(54) TOILET DEVICE, METHOD FOR CONTROLLING TOILET DEVICE, AND CONTROL PROGRAM OF TOILET DEVICE

(71) Applicant: TOTO LTD., Kitakyushu (JP)

(72) Inventors: Yutaro Terada, Kitakyushu (JP); Satoshi Kawada, Kitakyushu (JP); Takamasa Suzuki, Kitakyushu (JP); Junki Hamada, Kitakyushu (JP)

(73) Assignee: TOTO LTD., Kitakyushu (JP)

(*) Notice: Subject to any disclaimer, the term of this patent is extended or adjusted under 35 U.S.C. 154(b) by 239 days.

(21) Appl. No.: 18/603,284

(22) Filed: Mar. 13, 2024

(65) Prior Publication Data

US 2024/0330420 A1 Oct. 3, 2024

(30) Foreign Application Priority Data

Mar. 31, 2023 (JP) ................................ 2023-058669

(51) Int. Cl.
*G06F 21/31* (2013.01)

(52) U.S. Cl.
CPC .................................... *G06F 21/31* (2013.01)

(58) Field of Classification Search
CPC ....... G06F 21/31; H04W 12/06; H04W 76/11; E03D 5/10; E03D 5/105; H04M 1/72415
See application file for complete search history.

(56) References Cited

U.S. PATENT DOCUMENTS 8,027,518 B2 * 9/2011 Baker .................... G06V 40/12 345/169
11,527,101 B1 * 12/2022 Wisniewski ....... G06V 40/1365
(Continued)

FOREIGN PATENT DOCUMENTS

JP 2000-033052 A 2/2000
JP 2003-093349 A 4/2003
(Continued)

OTHER PUBLICATIONS

Park SM, Won DD, Lee BJ, Escobedo D, Esteva A, Aalipour A, Ge TJ, Kim JH, Suh S, Choi EH, Lozano AX. A mountable toilet system for personalized health monitoring via the analysis of excreta. Nature biomedical engineering. Jun. 1, 2020;4(6):624-35. ( Year: 2020).*

(Continued)

*Primary Examiner* — James R Turchen
(74) *Attorney, Agent, or Firm* — McDonald Hopkins LLC

(57) ABSTRACT

A toilet device includes a biological information measurement sensor, a controller, a wireless communication part, and a storage part. The biological information measurement sensor is configured to measure biological information. The controller is configured to transmit the biological information to a PDA. The wireless communication part is configured to connect the controller and the PDA by wireless communication. The controller is configured to perform a registration mode of associating identification information identifying the PDA and user information identifying the user, and storing the identification information and the user information in the storage part. The controller is configured to perform a user authentication of designating the user information and the identification information when receiving an authentication signal after performing the registration mode. When the user authentication is performed, the controller is configured to transmit a signal for connecting with the PDA having the identification information designated by the user authentication.

6 Claims, 9 Drawing Sheets

(56) References Cited

U.S. PATENT DOCUMENTS

| | | | | |
|---|---|---|---|---|
| 2015/0028996 | A1* | 1/2015 | Agrafioti | G06F 21/31 340/5.82 |
| 2016/0012249 | A1* | 1/2016 | Keppler | G06F 16/955 726/28 |
| 2017/0091412 | A1* | 3/2017 | Johnson | H04W 4/80 |
| 2018/0341443 | A1 | 11/2018 | Tsuchiya | |
| 2019/0290079 | A1 | 9/2019 | Takaki et al. | |
| 2021/0375470 | A1* | 12/2021 | Glover, Sr. | G16H 50/20 |
| 2022/0044801 | A1* | 2/2022 | Murthy | G06K 7/1417 |
| 2022/0309144 | A1 | 9/2022 | Koizumi | |
| 2023/0216977 | A1* | 7/2023 | Nakagawa | H04N 1/00437 358/1.14 |

FOREIGN PATENT DOCUMENTS

| | | | |
|---|---|---|---|
| JP | 2017-089236 | A | 5/2017 |
| JP | 2018-197971 | A | 12/2018 |
| JP | 2019-076659 | A | 5/2019 |
| JP | 2019-168443 | A | 10/2019 |
| JP | 2022-054995 | A | 4/2022 |
| JP | 2022-147466 | A | 10/2022 |
| JP | 2023-044234 | A | 3/2023 |

OTHER PUBLICATIONS

Heo SP, Jeong S. Internet of Things in the Bathroom: Smart Health-Monitoring Bidet System. Mathematical Problems in Engineering. 2021;2021(1):5736436. (Year: 2021).*

* cited by examiner

TOILET DEVICE, METHOD FOR CONTROLLING TOILET DEVICE, AND CONTROL PROGRAM OF TOILET DEVICE

CROSS-REFERENCE TO RELATED APPLICATIONS

This application is based upon and claims the benefit of priority from Japanese Patent Application No. 2023-058669, filed on Mar. 31, 2023; the entire contents of which are incorporated herein by reference.

FIELD

Embodiments described herein relate generally to a toilet device, a method for controlling a toilet device, and a control program of a toilet device.

BACKGROUND

There is a toilet seat device that can measure a user's body weight and acquire information of the user's body weight from an external terminal such as a smartphone or the like (e.g., 2019-168443 JP A). In such a toilet seat device, for example, user authentication to identify the user is performed by an operation input to a remote control.

From the perspective of privacy when transmitting the biological information of the user to the personal digital assistant, it is desirable not to transmit the biological information to a personal digital assistant other than the user's personal digital assistant.

SUMMARY

According to the embodiment, a toilet device includes a biological information measurement sensor, a controller, a wireless communication part, and a storage part. The biological information measurement sensor is configured to measure biological information of a user. The controller is configured to transmit the biological information to a personal digital assistant of the user. The wireless communication part is configured to connect the controller and the personal digital assistant by wireless communication. The controller is configured to perform a registration mode of associating identification information identifying the personal digital assistant and user information identifying the user, and storing the identification information and the user information in the storage part. The controller is configured to perform a user authentication of designating the user information and the identification information when receiving an authentication signal after performing the registration mode. When the user authentication is performed, the controller is configured to transmit a signal for connecting with the personal digital assistant having the identification information designated by the user authentication.

BRIEF DESCRIPTION OF THE DRAWINGS

FIG. 2 is a block diagram illustrating the toilet system including the toilet device according to the embodiment;

FIG. 3 is a front view illustrating a remote control of the toilet device according to the embodiment;

DETAILED DESCRIPTION

Figure 1:
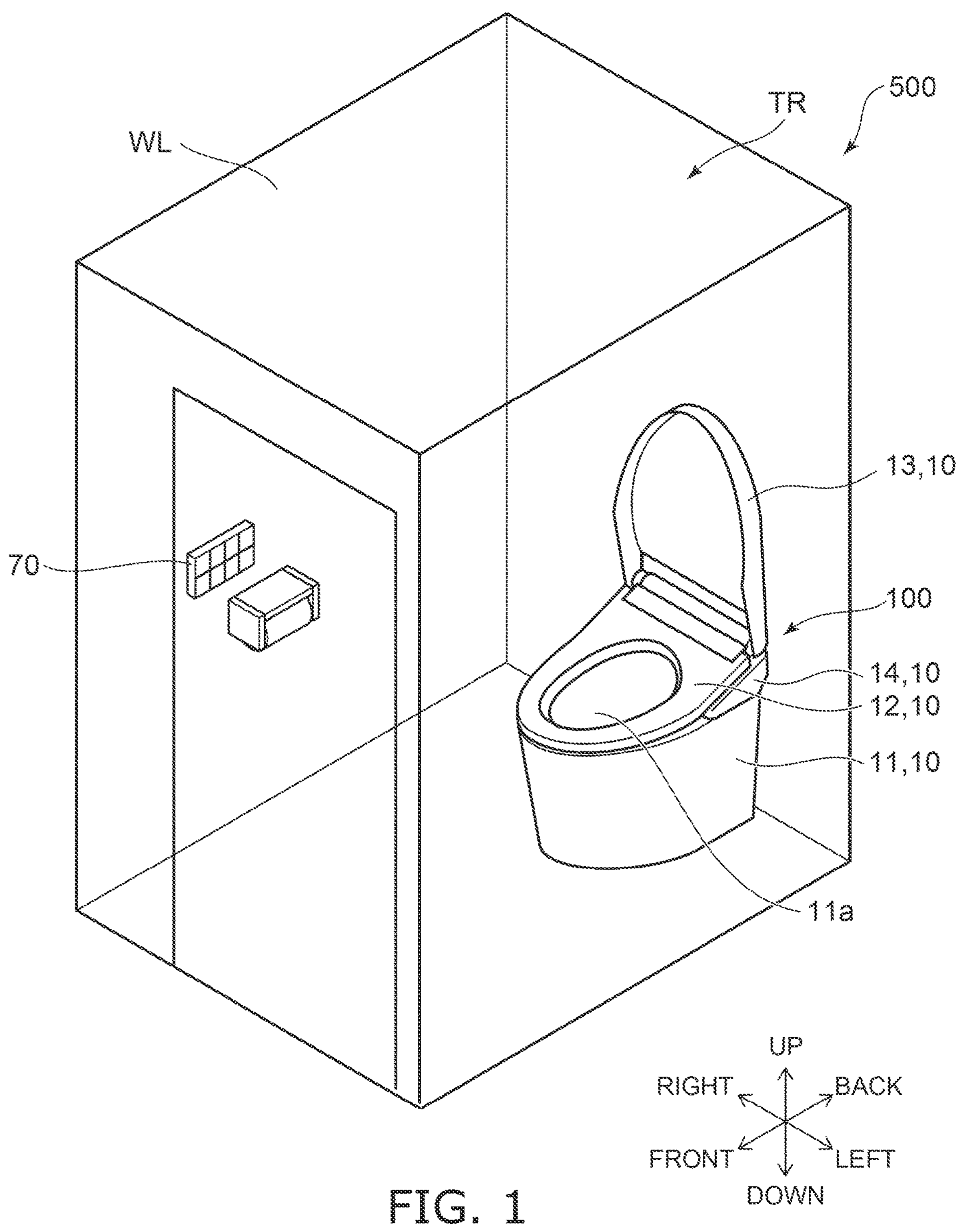
FIG. 1 is a perspective view illustrating a toilet system including a toilet device according to an embodiment.

A first aspect is a toilet device including a biological information measurement sensor configured to measure biological information of a user, a controller configured to transmit the biological information to a personal digital assistant of the user, a wireless communication part configured to connect the controller and the personal digital assistant by wireless communication, and a storage part; the controller is configured to perform a registration mode and a user authentication; the registration mode includes associating identification information identifying the personal digital assistant and user information identifying the user, and storing the identification information and the user information in the storage part; the user authentication includes designating the user information and the identification information when receiving an authentication signal after performing the registration mode; and the controller is configured to transmit, when the user authentication is performed, a signal for connecting with the personal digital assistant having the identification information designated by the user authentication.

According to the toilet device, when the user authentication is performed, a signal for connecting with the personal digital assistant having the identification information designated by the user authentication can be transmitted, and so the transmission of the biological information to a personal digital assistant other than the personal digital assistant of the user designated by the user authentication can be suppressed.

A second aspect is the toilet device of the first aspect, further including a remote control configured to transmit the authentication signal.

According to the toilet device, by including a remote control that transmits the authentication signal compared to when, for example, the authentication signal is transmitted by operating an operation unit or the like disposed in a location (e.g., the toilet unit, etc.) other than the remote control, the ease of use is good because the transmission of the authentication signal (the user authentication) can be used in a form close to normal use in which toilet flushing, bottom wash, etc., are possible without user authentication. That is, the ease of use is good because the remote control that is operated when performing toilet flushing, bottom wash, etc., can also perform the user authentication.

A third aspect is the toilet device of the second aspect, wherein the remote control includes an authentication switch used to transmit the authentication signal; the remote control selects the user information to be designated by the authentication signal based on a number of times that an operation input of the authentication switch is performed until a prescribed period has elapsed; and the remote control transmits the authentication signal when the prescribed period has elapsed.

For example, when the authentication switch is a normal toggle switch, and when the user that should be authenticated by the second operation operates the authentication switch twice when finished using the toilet device, there is a risk of a misauthentication in which the first operation undesirably finalizes the user at the timing of the first operation. In contrast, according to the toilet device, the user information for the user authentication can be switched based on the number of times that one authentication switch is operated by selecting the user information to be designated by the authentication signal based on the number of times that the operation input of the authentication switch is performed until a prescribed period has elapsed, and then by transmitting the authentication signal when the prescribed period has elapsed. Such switching can suppress misauthentication compared to when the authentication switch is a normal toggle switch.

A fourth aspect is the toilet device of the first or second aspect, wherein the controller is configured to transmit, after performing the registration mode, a signal for connecting with all of the personal digital assistants having the identification information stored in the storage part.

According to the toilet device, after performing the registration mode, a signal for connecting with all of the personal digital assistants having the identification information stored in the storage part can be transmitted so that, if necessary, biological information also can be transmitted to personal digital assistants other than the personal digital assistant of the user designated by the user authentication.

A fifth aspect is a method for controlling a toilet device; the toilet device is connectable with a personal digital assistant of a user by wireless communication; the method includes a registration process, a user authentication process performed after the registration process, a measurement process, and a transmission process performed after the measurement process; the registration process includes associating identification information identifying the personal digital assistant and user information identifying the user, and storing the identification information and the user information in a storage part; the user authentication process designates the user information and the identification information when receiving an authentication signal; the measurement process measures biological information of the user; the transmission process transmits the biological information to the personal digital assistant; and when the transmission process is performed after the user authentication process, the biological information is transmitted to the personal digital assistant having the identification information designated in the user authentication process.

According to the method for controlling the toilet device, when the transmission process is performed after the user authentication process, the transmission of the biological information to a personal digital assistant other than the personal digital assistant of the user designated by the user authentication can be suppressed by transmitting the biological information to the personal digital assistant having the identification information designated in the user authentication process.

A sixth aspect is a control program of a toilet device; the control program is installed in the toilet device; the toilet device is connectable with a personal digital assistant of a user by wireless communication; the control program, when executed by a processor of the toilet device, causes the toilet device to perform a registration process, a user authentication process performed after the registration process, a measurement process, and a transmission process performed after the measurement process; the registration process includes associating identification information identifying the personal digital assistant and user information identifying the user, and storing the identification information and the user information in a storage part; the user authentication process designates the user information and the identification information when receiving an authentication signal; the measurement process measures biological information of the user; the transmission process transmits the biological information to the personal digital assistant; and when the transmission process is performed after the user authentication process, the biological information is transmitted to the personal digital assistant having the identification information designated in the user authentication process.

According to the control program of the toilet device, when the transmission process is performed after the user authentication process, the transmission of the biological information to a personal digital assistant other than the personal digital assistant of the user designated by the user authentication can be suppressed by transmitting the biological information to the personal digital assistant having the identification information designated in the user authentication process.

Embodiments of the invention will now be described with reference to the drawings. Similar components in the drawings are marked with the same reference numerals; and a detailed description is omitted as appropriate.

Toilet Device

FIG. 1 is a perspective view illustrating a toilet system including a toilet device according to an embodiment.

Figures 2, 3:
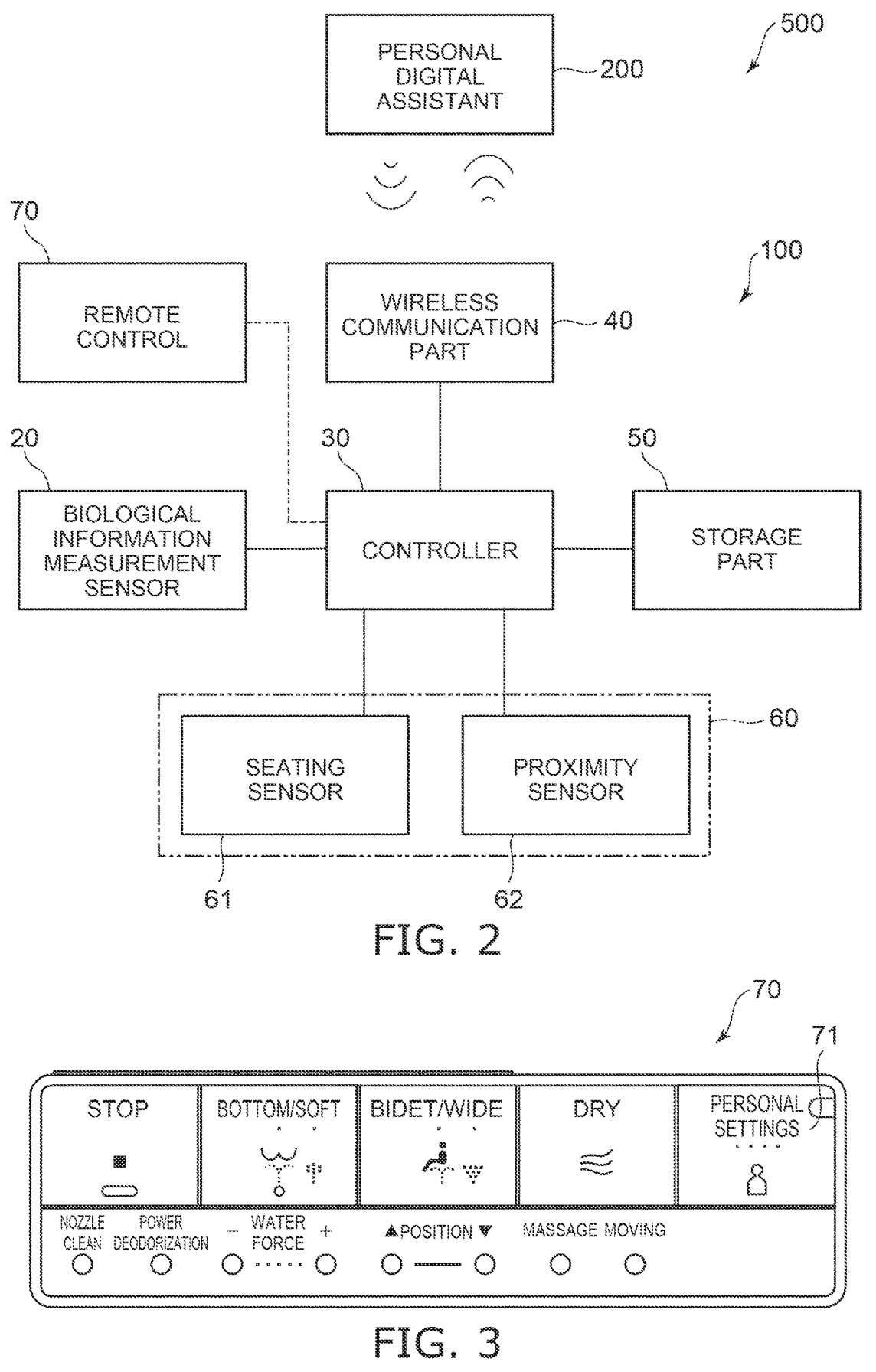

FIG. 2 is a block diagram illustrating the toilet system including the toilet device according to the embodiment.

FIG. 3 is a front view illustrating a remote control of the toilet device according to the embodiment.

As illustrated in FIGS. 1 to 3, the toilet system 500 according to the embodiment includes the toilet device 100 and a personal digital assistant 200.

The toilet device 100 includes a toilet unit 10, a biological information measurement sensor 20, a controller 30, a wireless communication part 40, a storage part 50, a human body detection sensor 60, and a remote control 70. The toilet device 100 is disposed inside a toilet room TR.

The toilet unit 10 includes a toilet 11, a toilet seat 12, a toilet lid 13, and a casing 14. The toilet 11 is a western-style sit-down toilet. The toilet 11 includes a concave bowl 11*a* that is recessed downward. The bowl 11*a* receives human waste, urine, etc., excreted from the user.

The toilet seat 12 and the toilet lid 13 each are pivotally supported to be openable and closable with respect to the casing 14. FIG. 1 illustrates a state in which the toilet seat 12 is closed and the toilet lid 13 is open. The toilet lid 13 covers the toilet seat 12 in the closed state from above. The toilet lid 13 is provided as necessary and is omissible.

In this specification, up, down, front, back, right, and left when viewed by a user seated on the toilet seat 12 with the user's back facing the toilet lid 13 are respectively taken as "up/upward/above", "down/downward/below", "front", "back", "right", and "left".

The casing 14 stores various functional units. For example, an automatic opening/closing unit automatically opening and closing the toilet seat 12 and/or the toilet lid 13, a private part washing unit including a nozzle for washing a private part of the user, a private part drying unit for drying a private part of the user, a deodorizing unit that deodorizes, etc., are stored inside the casing 14. These various functional units are provided as necessary and are omissible. The controller 30, the wireless communication part 40, the storage part 50, etc., also are stored inside the casing 14.

The biological information measurement sensor 20 measures biological information of the user. The biological information includes, for example, information of the user's pulsatory motion, excrement condition, etc. The biological information measurement sensor 20 is electrically connected with the controller 30. The biological information measurement sensor 20 outputs the measured biological information to the controller 30.

The biological information measurement sensor 20 includes, for example, at least one of a pulsatory motion sensor or an image sensor. For example, the pulsatory motion sensor is disposed in the toilet seat 12. The pulsatory motion sensor includes, for example, a laser sensor. For example, the pulsatory motion sensor measures the pulsatory motion of the user seated on the toilet seat 12 by using hemoglobin infrared reflection. For example, the image sensor is disposed inside the casing 14. The image sensor includes, for example, at least one of an area camera or a line sensor in which multiple pixels are arranged in a line shape.

The controller 30 is electrically connected with the biological information measurement sensor 20, the wireless communication part 40, the storage part 50, and the human body detection sensor 60. The controller 30 acquires the measurement result (the biological information) of the biological information measurement sensor 20 and the detection result of the human body detection sensor 60. The controller 30 controls the biological information measurement sensor 20, the wireless communication part 40, and the storage part 50. For example, the controller 30 controls the start and stop of the measurement of the biological information by the biological information measurement sensor 20. The controller 30 is, for example, a control circuit including an IC element. One or multiple controllers 30 may be included. When multiple controllers 30 are included, the controllers 30 may be concentrated or dispersed. The controller 30 includes, for example, a main body controller (a DC controller), a sensor controller (a processor unit), and a wireless controller. For example, the start and stop of the measurement of the biological information measurement sensor 20 are controlled by the main body controller and/or the sensor controller.

The controller 30 acquires analysis information by analyzing the biological information acquired from the biological information measurement sensor 20. For example, by analyzing the information (the biological information) of the pulsatory motion of the user acquired from the pulsatory motion sensor, the controller 30 can acquire (estimate) information of the vascular age, lower limb blood circulation status, fitness level, basal metabolism, body water level, body clock, normal heart rate, etc. For example, the controller 30 also can acquire (estimate) information of the state of the intestinal environment by using image data acquired from the image sensor to analyze the state (the shape, color, amount, etc.) of the excrement and by further analyzing the information (the biological information) of the excrement condition. For example, the analysis of the biological information is performed by the main body controller and/or the sensor controller.

The controller 30 transmits the analysis information to the personal digital assistant 200 of the user via the wireless communication part 40. The controller 30 also stores the analysis information in the storage part 50. The controller 30 also erases the analysis information stored in the storage part 50 from the storage part 50. The storing and erasing of the analysis information in the storage part 50 are described below. The controller 30 may transmit the biological information acquired from the biological information measurement sensor 20 to the personal digital assistant 200 of the user via the wireless communication part 40. In such a case, some or all of the analysis of the biological information may be performed by the personal digital assistant 200, or may be performed by a cloud server via the personal digital assistant 200. The controller 30 also may transmit the analysis information or biological information to the personal digital assistant 200 via a cloud server.

The wireless communication part 40 is configured to connect the controller 30 and the personal digital assistant 200 by wireless communication. The wireless communication part 40 is electrically connected with the controller 30. The wireless communication part 40 is, for example, a communication module configured to communicate using a Bluetooth (registered trademark) standard such as BLE (Bluetooth Low Energy), etc. For example, the wireless communication part 40 is configured to connect the controller 30 and the personal digital assistant 200 positioned inside the toilet room TR by wireless communication. For example, the connection between the controller 30 and the personal digital assistant 200 is disconnected when the personal digital assistant 200 is outside the toilet room TR. Also, the connection between the controller 30 and the personal digital assistant 200 is disconnected when, for example, a disconnect request signal is transmitted from the personal digital assistant 200. The connection between the toilet device 100 (the controller 30) and the personal digital assistant 200 is described below.

The storage part 50 is configured to store the information output from the controller 30. The storage part 50 is electrically connected with the controller 30. One or multiple storage parts 50 may be included. When multiple storage parts 50 are included, the storage parts 50 may be concentrated or dispersed. The storage part 50 includes, for example, a main body storage part, a sensor storage part, and a wireless storage part. The main body storage part is electrically connected with the main body controller. The sensor storage part is electrically connected with the sensor controller. The wireless storage part is electrically connected with the wireless controller. For example, the storage part 50 stores the analysis information. For example, in the state in which the user authentication has been performed, the storage part 50 associates and stores the analysis information and the user information identifying the user. More specifically, for example, information in which the analysis information and the user information are associated is stored in the sensor storage part. The user authentication is described below.

The storage part 50 associates and stores identification information identifying the personal digital assistant 200 and user information identifying the user. More specifically, for example, information in which the identification information and the user information are associated is stored in the wireless storage part. A registration mode of associating and storing the identification information and the user information is described below. The identification information includes, for example, at least one of an ID number, a BD address, a MAC address, or pairing information (cryptographic information shared by the toilet device 100 and the control program of the personal digital assistant 200 when pairing). It is favorable for the identification information to include the pairing information. For example, the personal digital assistant 200 that receives an advertisement signal from the toilet device 100 transmits a wireless communication request to the toilet device 100; the toilet device 100 that receives the wireless communication request permits wireless communication; and communication is established. When communicating with the personal digital assistant 200 of a user 1, if the pairing information and the user number are transmitted with the wireless communication request, the toilet device 100 can determine, based on the user No. 1 being paired, that the connection request is from the personal digital assistant 200 of the user 1.

The human body detection sensor 60 detects the state of the user. The human body detection sensor 60 includes, for example, at least one of a seating sensor 61 or a proximity sensor 62. For example, the seating sensor 61 is disposed at the toilet seat 12. The seating sensor 61 includes, for example, a capacitive sensor. For example, the seating sensor 61 detects the seating of the user on the toilet seat 12 and the user leaving the toilet seat 12. For example, the proximity sensor 62 is disposed inside the casing 14. The proximity sensor 62 includes, for example, at least one of a radio wave sensor or an infrared sensor. For example, the proximity sensor 62 detects the user approaching the toilet unit 10 and the user moving away from the toilet unit 10. For example, the proximity sensor 62 detects the user entering the toilet room TR and the user exiting the toilet room TR. The proximity sensor 62 may be disposed outside the casing 14.

For example, the remote control 70 is disposed at a wall surface WL of the toilet room TR. The remote control 70 is an operation unit for remotely operating various functional units stored inside the casing 14. For example, the remote control 70 transmits, to the controller 30, signals for operating the various functional units based on operation input of the remote control 70 by the user. When receiving the signals from the remote control 70, the controller 30 controls the various functional units based on the signals. For example, the remote control 70 is connected with the controller 30 by wireless communication. For example, the wireless communication part that connects the remote control 70 and the controller 30 is provided separately from the wireless communication part 40.

The remote control 70 includes, for example, an authentication switch 71 for transmitting an authentication signal. When an operation input of the authentication switch 71 is performed, the remote control 70 transmits the authentication signal to the controller 30. For example, the controller 30 can perform user authentication based on the authentication signal from the remote control 70. The user authentication is described below.

The personal digital assistant 200 is, for example, a smartphone, tablet terminal, or the like possessed by the user. However, the personal digital assistant 200 is not limited to such terminals; any terminal that can be carried by the user may be used.

A control program (application software) for connecting with the toilet device 100 and displaying information (e.g., analysis information) transmitted from the toilet device 100 is preinstalled in the personal digital assistant 200.

Figure 4:
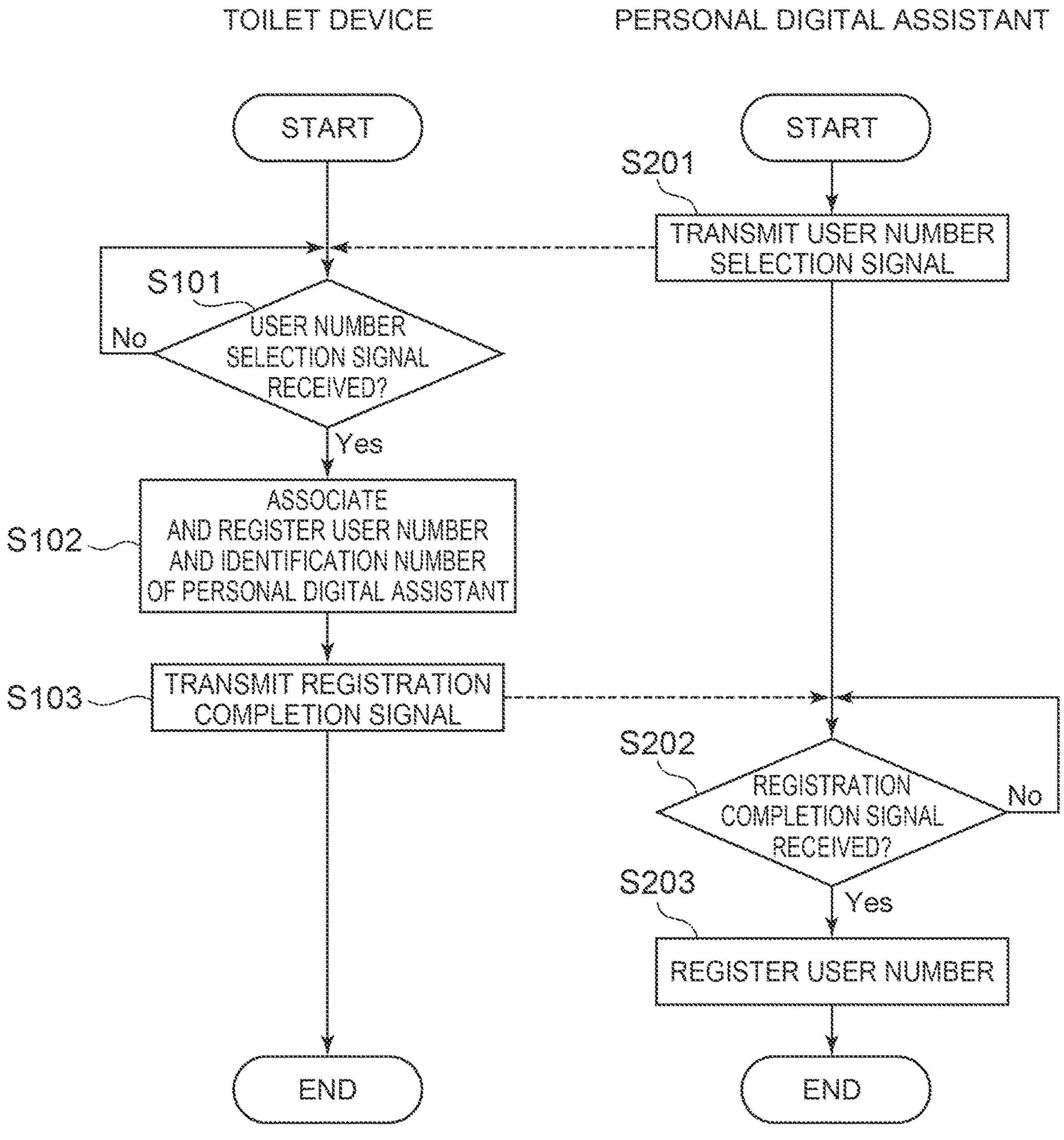
FIG. 4 is a flowchart illustrating an example of an operation of a registration mode of the toilet device and the personal digital assistant according to the embodiment.

FIG. 4 is a flowchart illustrating an example of an operation of a registration mode of the toilet device and the personal digital assistant according to the embodiment.

Figure 5:
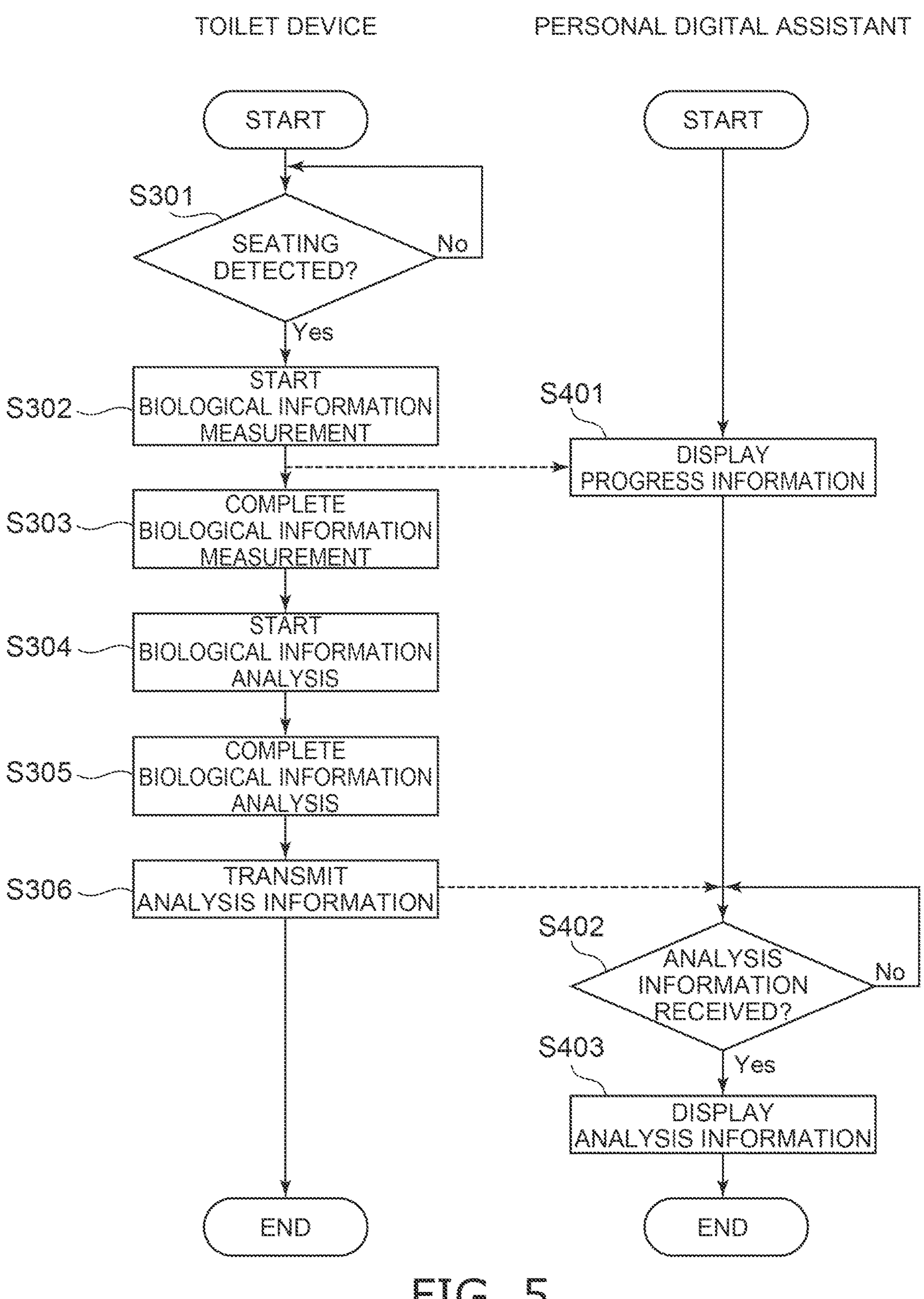
FIG. 5 is a flowchart illustrating an example of an operation of a use mode of the toilet device and the personal digital assistant according to the embodiment.

FIG. 5 is a flowchart illustrating an example of an operation of a use mode of the toilet device and the personal digital assistant according to the embodiment.

As illustrated in FIGS. 4 and 5, the toilet device 100 (the controller 30) includes the registration mode and the use mode.

The registration mode is a mode in which user registration can be performed. User registration is the operation of associating the identification information identifying the personal digital assistant 200 and the user information (e.g., the user number) identifying the user, and storing the identification information and the user information in the storage part 50. The registration mode is performed in a state in which the toilet device 100 (the controller 30) and the personal digital assistant 200 are connected.

The use mode is a mode in which measurement of the biological information, analysis of the biological information, and transmission of the analysis information can be performed. User authentication can be performed in the use mode when user registration has already been performed. The user authentication is the designation of the user information (the user number) of the user using the toilet device 100 and the identification information of the personal digital assistant 200 of the user. By performing the user authentication, for example, the analysis information can be associated with the user information (the user number) and/or the identification information of the personal digital assistant 200 of the user and stored in the storage part 50. Also, by performing the user authentication, for example, the toilet device 100 and the personal digital assistant 200 designated by the user authentication can be selectively connected.

For example, the user authentication is performed by connecting the toilet device 100 (the controller 30) and the personal digital assistant 200. In such a case, the personal digital assistant 200 that is connected with the toilet device 100 (the controller 30) transmits, to the toilet device 100, an authentication signal including the user information (the user number) registered in the personal digital assistant 200. When receiving the authentication signal, the toilet device 100 determines that the user of the user information (the user number) included in the authentication signal is using the toilet device 100. As a result, the user information (the user number) of the user using the toilet device 100 and the identification information of the personal digital assistant 200 of the user can be designated. The user authentication using the personal digital assistant 200 is described below.

For example, the user authentication may be performed by an operation input of the authentication switch 71 of the remote control 70. In such a case, when the operation input of the authentication switch 71 (e.g., the selection of the user number) is performed, the remote control 70 transmits an authentication signal including the user information (the user number) to the toilet device 100. When receiving the authentication signal, the toilet device 100 determines that the user of the user information (the user number) included in the authentication signal is using the toilet device 100. As a result, the user information (the user number) of the user using the toilet device 100 and the identification information of the personal digital assistant 200 of the user can be designated. The user authentication using the remote control 70 is described below.

The registration mode will now be described in more detail.

In the registration mode as illustrated in FIG. 4, the toilet device 100 (the controller 30) determines whether or not a user number selection signal is received (step S101). The toilet device 100 (the controller 30) repeats step S101 until the user number selection signal is received (step S101: No). The user number selection signal indicates a user number selected by the personal digital assistant 200.

When the user number selection signal is received (step S101: Yes), the toilet device 100 (the controller 30) associates the selected user number and the identification number of the personal digital assistant 200 transmitting the user number selection signal and stores (registers) the selected user number and the identification number in the storage part 50 (step S102).

The user number and the identification number are associated and registered (step S102); and the toilet device 100 (the controller 30) transmits a registration completion signal to the personal digital assistant 200 (step S103). The registration completion signal indicates that the registration is completed.

When the user number is selected by the personal digital assistant 200, the personal digital assistant 200 transmits the user number selection signal to the toilet device 100 (step S201).

When the user number selection signal is transmitted to the toilet device 100 (step S201), the personal digital assistant 200 determines whether or not the registration completion signal is received from the toilet device 100 (step S202). The personal digital assistant 200 repeats step S202 until the registration completion signal is received (step S202: No).

When the registration completion signal is received (step S202: Yes), the personal digital assistant 200 stores (registers) the registered user number (step S203).

The use mode will now be described in more detail.

In the use mode as illustrated in FIG. 5, the toilet device 100 (the controller 30) determines whether or not the seating sensor 61 detects the seating of the user on the toilet seat 12 (step S301). The toilet device 100 (the controller 30) repeats step S301 until the seating sensor 61 detects the seating of the user on the toilet seat 12 (step S301: No).

When the seating sensor 61 detects the seating of the user on the toilet seat 12 (step S301: Yes), the toilet device 100 (the controller 30) starts the measurement of biological information (step S302). As described above, the measurement of the biological information is performed by the biological information measurement sensor 20 such as a pulsatory motion sensor, an image sensor, etc.

When the measurement of the biological information is completed (step S303), the toilet device 100 (the controller 30) starts the analysis of the biological information (step S304). As described above, the analysis of the biological information is performed by the controller 30. When the user is detected leaving the toilet seat 12 before the measurement is completed, for example, the toilet device 100 (the controller 30) ends the measurement of the biological information partway, and starts the analysis of the biological information.

When the analysis of the biological information is completed (step S305), the toilet device 100 (the controller 30) transmits the analysis information obtained by the analysis to the personal digital assistant 200 (step S306). As described above, the transmission of the analysis information is performed by the controller 30 via the wireless communication part 40.

For example, the personal digital assistant 200 displays progress information of the measurement of the biological information (step S401). The display of the progress information is described below.

The personal digital assistant 200 determines whether or not the analysis information is received (step S402). The personal digital assistant 200 repeats step S402 until the analysis information is received (step S402: No).

When the analysis information is received (step S402: Yes), the personal digital assistant 200 displays the analysis information (step S403). The personal digital assistant 200 may store the analysis information to be able to display the analysis information even after the connection between the toilet device 100 (the controller 30) and the personal digital assistant 200 is disconnected.

In step S301, the toilet device 100 (the controller 30) may determine whether or not the proximity sensor 62 has detected the approach of the user to the toilet unit 10, or may determine whether or not the proximity sensor 62 has detected the user entering the toilet room TR. That is, the trigger of the measurement start of the biological information of the toilet device 100 (the controller 30) may be the seating of the user on the toilet seat 12, the approach of the user to the toilet unit 10, or the user entering the toilet room TR. The toilet device 100 (the controller 30) may start the measurement of the biological information when the user authentication is completed. The toilet device 100 (the controller 30) may operate a line sensor in a power saving mode and then start the measurement of the biological information when a falling object is detected. Or, the toilet device 100 (the controller 30) may drive a laser sensor in a power saving mode and then start the measurement of the biological information when an output change is detected.

The connection between the toilet device 100 and the personal digital assistant 200 will now be described in more detail.

Figure 6:
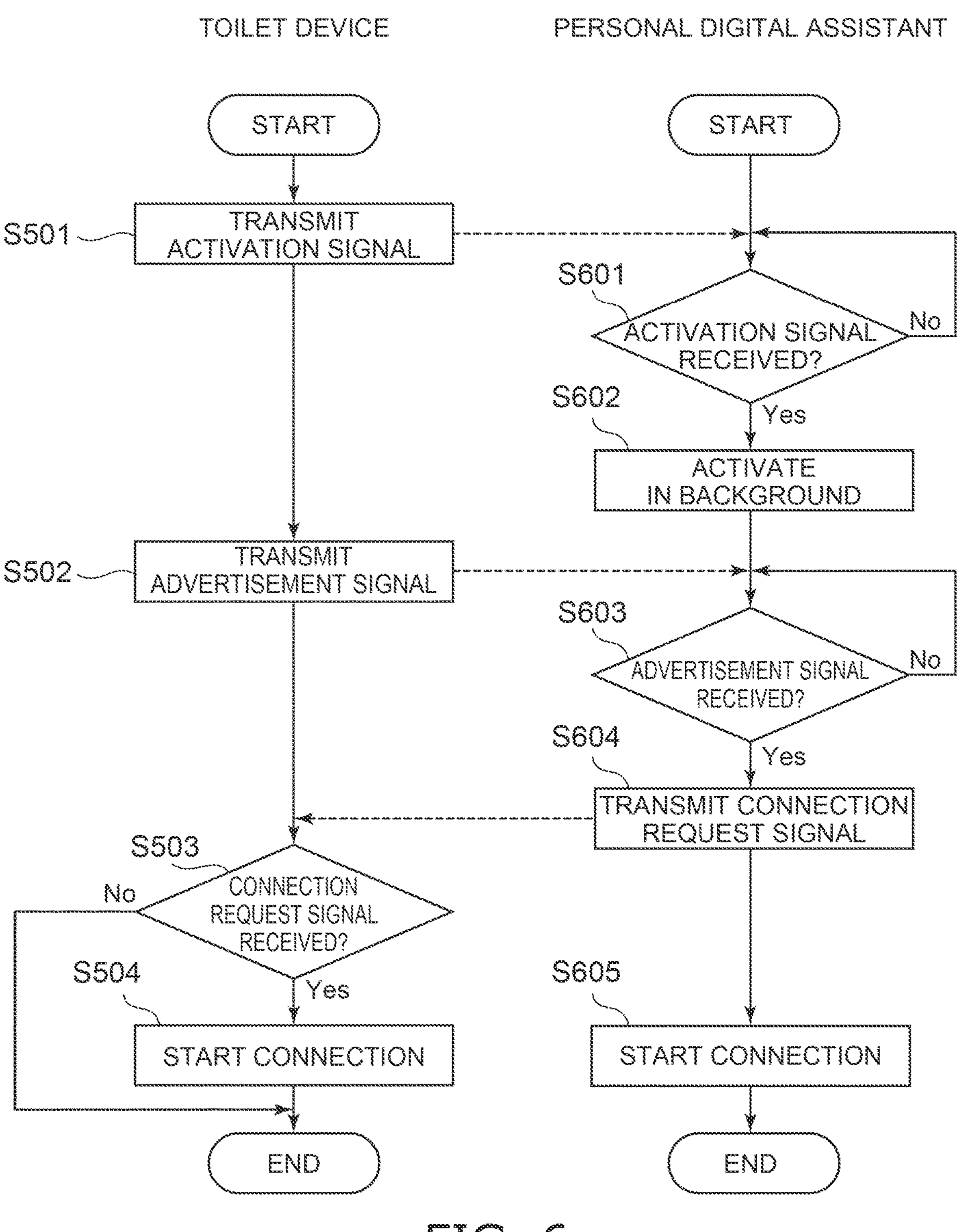
FIG. 6 is a flowchart illustrating an example of an operation when connecting the toilet device and the personal digital assistant according to the embodiment.

FIG. 6 is a flowchart illustrating an example of an operation when connecting the toilet device and the personal digital assistant according to the embodiment.

As illustrated in FIG. 6, the toilet device 100 (the controller 30) transmits an activation signal to the personal digital assistant 200 (step S501). The activation signal is a signal to set the personal digital assistant 200 to a background active state. The background active state is a state in which an advertisement signal can be received.

When transmitting the activation signal (step S501), the toilet device 100 (the controller 30) transmits an advertisement signal to the personal digital assistant 200 (step S502). The advertisement signal is a signal for causing the personal digital assistant 200 to start a connection with the toilet device 100 (the controller 30).

When transmitting the advertisement signal (step S502), the toilet device 100 (the controller 30) determines whether or not a connection request signal is received (step S503). The connection request signal is a signal for causing the toilet device 100 (the controller 30) to start a connection with the personal digital assistant 200.

When the connection request signal is received (step S503: Yes), the toilet device 100 (the controller 30) starts the connection with the personal digital assistant 200 (step S504). When the connection request signal is not received (step S503: No), the toilet device 100 (the controller 30) does not perform step S504. That is, when the connection request signal is not received (step S503: No), the toilet device 100 (the controller 30) does not start a connection with the personal digital assistant 200.

The personal digital assistant 200 determines whether or not the activation signal is received (step S601). The personal digital assistant 200 repeats step S601 until the activation signal is received (step S601: No).

When the activation signal is received (step S601: Yes), the personal digital assistant 200 is set to a background active state (step S602).

When set to the background active state (step S602), the personal digital assistant 200 determines whether or not the advertisement signal is received (step S603). The personal digital assistant 200 repeats step S603 until the advertisement signal is received (step S603: No).

When the advertisement signal is received (step S603: Yes), the personal digital assistant 200 transmits a connection request signal to the toilet device 100 (the controller 30) (step S604) and starts the connection with the toilet device 100 (the controller 30) (step S605).

The user authentication using the personal digital assistant 200 will now be described in more detail.

Figure 7:
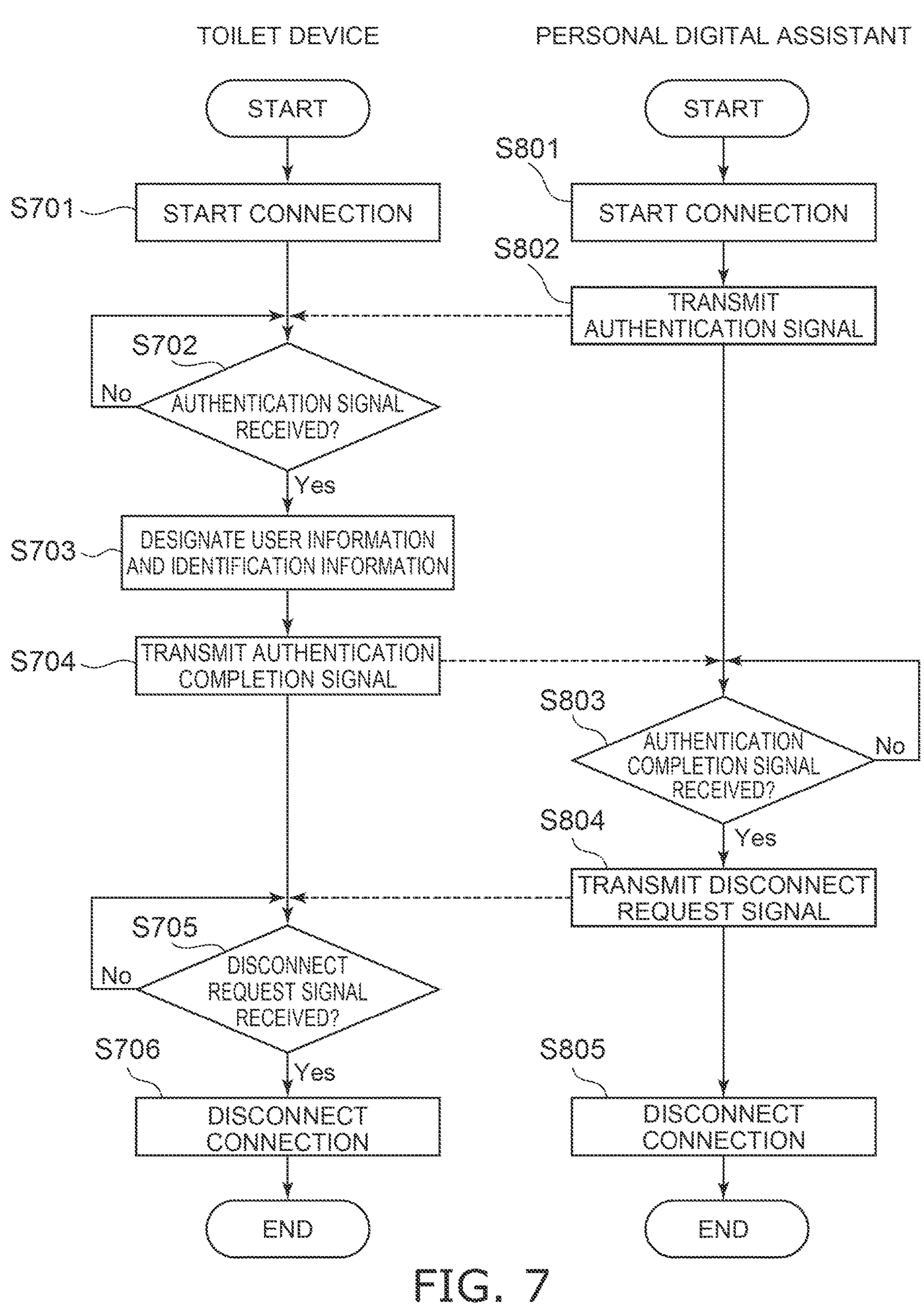
FIG. 7 is a flowchart illustrating an example of an operation in the user authentication of the toilet device and the personal digital assistant according to the embodiment.

FIG. 7 is a flowchart illustrating an example of an operation in the user authentication of the toilet device and the personal digital assistant according to the embodiment.

As illustrated in FIG. 7, when starting the connection with the personal digital assistant 200 (step S701), the toilet device 100 (the controller 30) determines whether or not an authentication signal is received (step S702). The toilet device 100 (the controller 30) repeats step S702 until the authentication signal is received (step S702: No). The authentication signal is, for example, a signal that includes the user information (the user number).

When the authentication signal is received (step S702: Yes), the toilet device 100 (the controller 30) designates the user information and the identification information based on the authentication signal (step S703). More specifically, the toilet device 100 (the controller 30) designates the user information included in the authentication signal and designates the personal digital assistant 200 having the identification information associated with the user information included in the authentication signal.

When the user information and the identification information are designated (step S703), the toilet device 100 (the controller 30) transmits an authentication completion signal to the personal digital assistant 200 (step S704). The authentication completion signal indicates that the user authentication is completed.

When transmitting the authentication completion signal (step S704), the toilet device 100 (the controller 30) determines whether or not a disconnect request signal is received (step S705). The toilet device 100 (the controller 30) repeats step S705 until the disconnect request signal is received (step S705: No). The disconnect request signal is a signal for causing the toilet device 100 (the controller 30) to disconnect the connection with the personal digital assistant 200.

When the disconnect request signal is received (step S705: Yes), the toilet device 100 (the controller 30) disconnects the connection with the personal digital assistant 200 (step S706).

When starting the connection with the toilet device 100 (the controller 30) (step S801), the personal digital assistant 200 transmits the authentication signal (step S802).

When transmitting the authentication signal (step S802), the personal digital assistant 200 determines whether or not the authentication completion signal is received (step S803). The personal digital assistant 200 repeats step S803 until the authentication completion signal is received (step S803: No).

When the authentication completion signal is received (step S803: Yes), the personal digital assistant 200 transmits the disconnect request signal (step S804) and disconnects the connection with the toilet device 100 (the controller 30) (step S805).

Thus, after performing the registration mode (i.e., in the state in which the identification information and the user information are associated and stored in the storage part 50), the toilet device 100 (the controller 30) can perform user authentication in the use mode to designate the user information and the identification information when receiving the authentication signal.

The user authentication using the remote control 70 will now be described in more detail.

Figure 8:
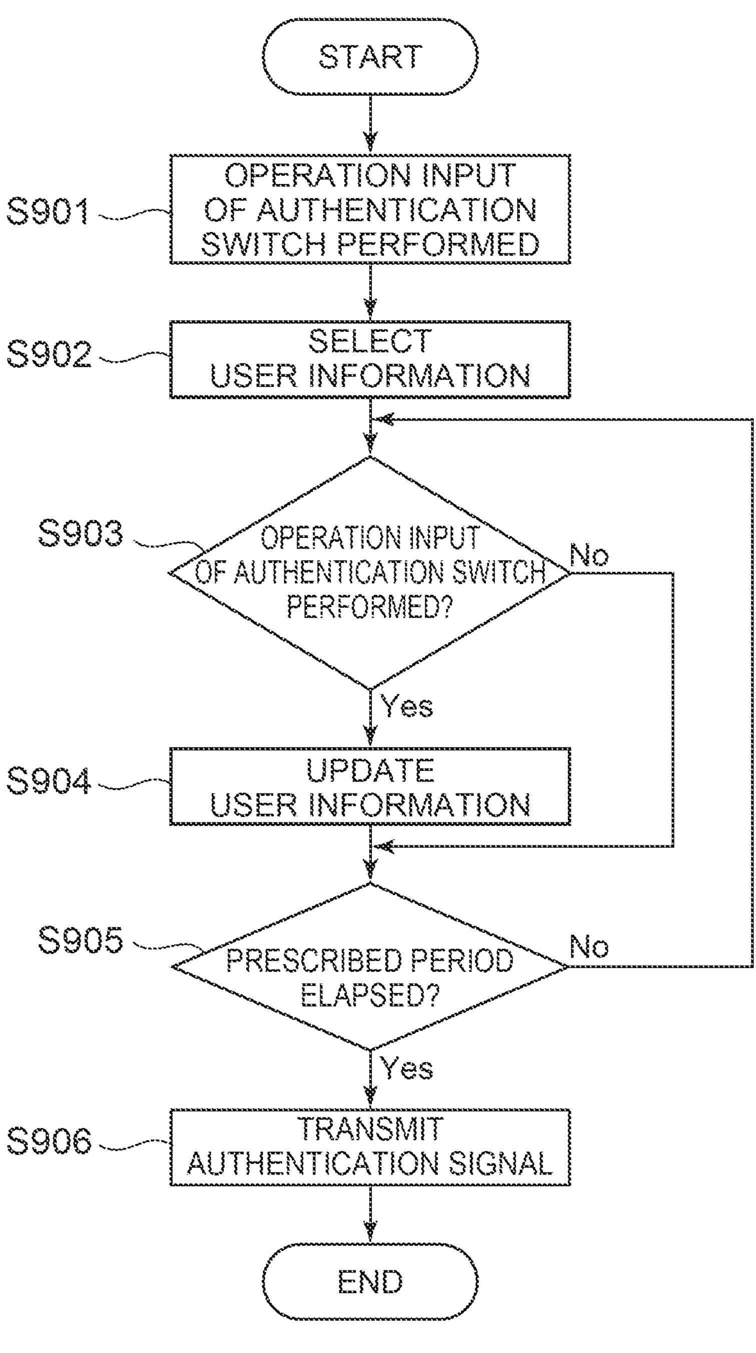
FIG. 8 is a flowchart illustrating an example of an operation in the user authentication by the remote control of the toilet device according to the embodiment.

FIG. 8 is a flowchart illustrating an example of an operation in the user authentication by the remote control of the toilet device according to the embodiment.

As illustrated in FIG. 8, when an operation input of the authentication switch 71 is performed (step S901), the remote control 70 selects user information (step S902). More specifically, the remote control 70 selects, for example, the user number 1 for the first operation input.

When selecting the user information (step S902), the remote control 70 determines whether or not a further operation input of the authentication switch 71 is performed (step S903). When a further operation input of the authentication switch 71 has been performed (step S903: Yes), the remote control 70 updates the user information (step S904). More specifically, for example, the remote control 70 selects the user number 2 when a second operation input is performed. For example, the remote control 70 selects the user number 3 when a third operation input is performed. For example, the remote control 70 selects the user number N when the Nth operation input (N being a natural number) is performed. In other words, for example, the remote control 70 adds 1 to the numerical value of the user number when the operation input is performed. For example, the remote control 70 selects the user number 1 when a further operation input is performed in a state in which the numerical value of the user number has reached an upper limit.

When updating the user information (step S904), the remote control 70 determines whether or not a prescribed period has elapsed from the previous operation input (step S905). When the prescribed period has not elapsed from the previous operation input (step S905: No), the remote control 70 returns to step S903.

When a further operation input is not performed (step S903: No), the remote control 70 performs step S905 without performing step S904. The remote control 70 repeats step S903, step S904, and step S905 until the prescribed period has elapsed from the previous operation input.

When the prescribed period has elapsed from the previous operation input (step S905: Yes), the remote control 70 finalizes the user information included in the authentication signal and transmits the authentication signal to the controller 30 (step S906). More specifically, the remote control 70 transmits the authentication signal including the finally-selected user number.

Thus, by including the remote control 70 that transmits the authentication signal, compared to when, for example, the authentication signal is transmitted by operating an operation unit or the like disposed in a location (e.g., the toilet unit 10, etc.) other than the remote control 70, the transmission of the authentication signal (the user authentication) can be used in a form close to normal use which is easier to use.

The user information for the user authentication can be switched by the number of times one authentication switch 71 is operated by selecting the user information to be designated by the authentication signal based on the number of times that the operation input of the authentication switch 71 is performed until the prescribed period has elapsed, and then transmitting the authentication signal when the prescribed period has elapsed. Misauthentication can be suppressed thereby.

The progress check of the measurement of the biological information will now be described in more detail.

Figure 9:
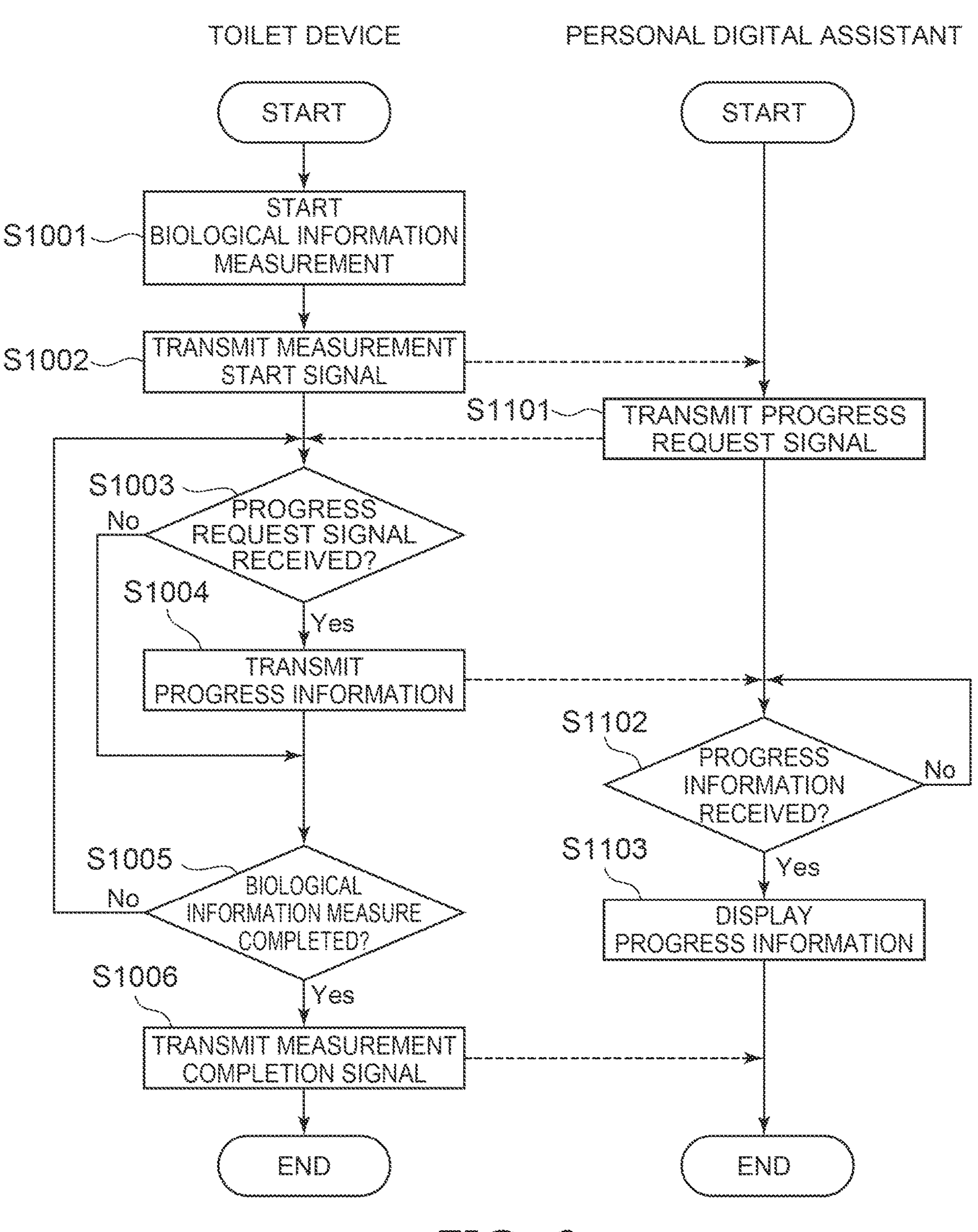
FIG. 9 is a flowchart illustrating an example of an operation of the use mode of the toilet device according to the embodiment.

FIG. 9 is a flowchart illustrating an example of an operation of the use mode of the toilet device according to the embodiment.

As illustrated in FIG. 9, when starting the measurement of the biological information (step S1001), the toilet device 100 (the controller 30) transmits a measurement start signal to the personal digital assistant 200 (step S1002). The measurement start signal indicates that the measurement of the biological information has started.

When transmitting the measurement start signal (step S1002), the toilet device 100 (the controller 30) determines whether or not a progress request signal is received (step S1003). The progress request signal is a signal for causing the toilet device 100 (the controller 30) to transmit progress information. The progress information indicates the progress of the measurement of the biological information. When receiving the progress request signal (step S1003: Yes), the toilet device 100 (the controller 30) transmits the progress information (step S1004).

When transmitting the progress information (step S1004), the toilet device 100 (the controller 30) determines whether or not the measurement of the biological information is completed (step S1005). When the progress request signal is not received (step S1003: No), the toilet device 100 (the controller 30) performs step S1005 without performing step S1004.

When the measurement of the biological information is not completed (step S1005: No), the toilet device 100 (the controller 30) returns to step S1003. The toilet device 100 (the controller 30) repeats step S1003, step S1004, and step S1005 until the measurement of the biological information is completed.

When the measurement of the biological information is completed (step S1005: Yes), the toilet device 100 (the controller 30) transmits a measurement completion signal to the personal digital assistant 200 (step S1006). The measurement completion signal indicates that the measurement of the biological information is completed.

When receiving the measurement start signal, the personal digital assistant 200 is enabled to transmit the progress request signal until the measurement completion signal is received. For example, the personal digital assistant 200 transmits the progress request signal to the toilet device 100 (the controller 30) (step S1101) when an operation input to display the progress information is input to the personal digital assistant 200 while the personal digital assistant 200 is enabled to transmit the progress request signal.

When transmitting the progress request signal (step S1101), the personal digital assistant 200 determines whether or not the progress information is received (step S1102). The personal digital assistant 200 repeats step S1102 until the progress information is received (step S1102: No).

When the progress information is received (step S1102: Yes), the personal digital assistant 200 displays the progress information (step S1103).

The personal digital assistant 200 maintains the state of being enabled to transmit the progress request signal until the measurement completion signal is received. When the measurement completion signal is received, the personal digital assistant 200 is set to the state of not being enabled to transmit the progress request signal.

In the example, when the measurement start signal is received, the progress information is displayed by the personal digital assistant 200 only while the measurement is being performed by setting the personal digital assistant 200 to a state of being enabled to transmit the progress request signal until the measurement completion signal is received; however, the progress information may be displayed by the personal digital assistant 200 only while the measurement is being performed by enabling the toilet device 100 (the controller 30) to transmit the progress information only while the measurement is being performed. That is, when the measurement is not being performed, the toilet device 100 (the controller 30) may not transmit the progress information even when the progress request signal is received. In such a case, step S1102 and step S1006 are omissible.

Figure 10:
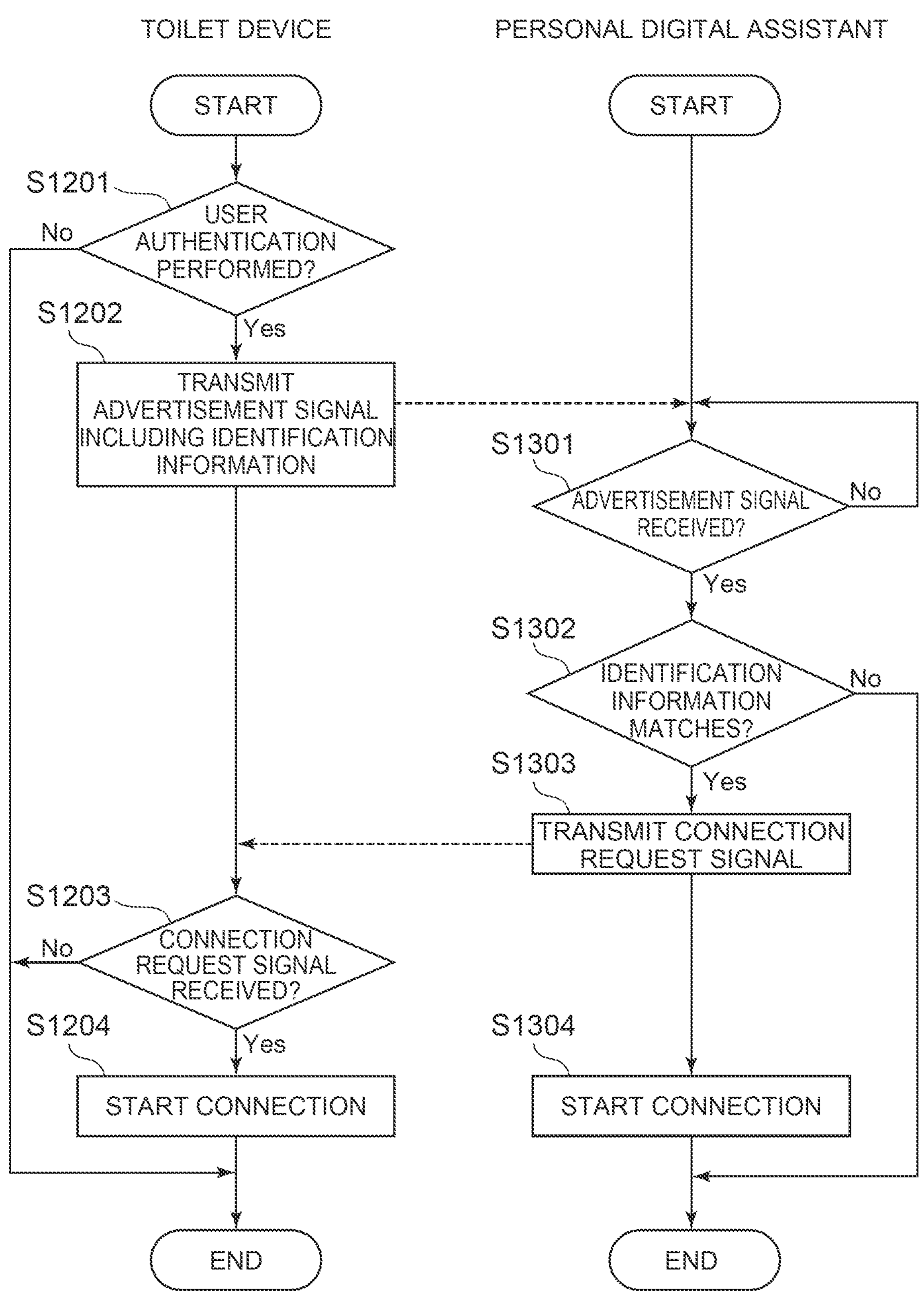
FIG. 10 is a flowchart illustrating an example of an operation when connecting the toilet device and the personal digital assistant according to the embodiment.

FIG. 10 is a flowchart illustrating an example of an operation when connecting the toilet device and the personal digital assistant according to the embodiment.

FIG. 10 describes an operation after the toilet device 100 (the controller 30) has transmitted the activation signal, and the personal digital assistant that received the activation signal is in the background active state.

As illustrated in FIG. 10, the toilet device 100 (the controller 30) determines whether or not the user authentication has been performed (step S1201). When the user authentication has been performed (step S1201: Yes), the toilet device 100 (the controller 30) transmits an advertisement signal including the identification information designated by the user authentication (step S1202). That is, when the user authentication is performed (step S1201: Yes), the toilet device 100 (the controller 30) is enabled to transmit a signal for connecting with the personal digital assistant 200 having the identification information designated by the user authentication.

When transmitting the advertisement signal including the identification information designated by the user authentication (step S1202), the toilet device 100 (the controller 30) determines whether or not a connection request signal is received (step S1203).

When receiving the connection request signal (step S1203: Yes), the toilet device 100 (the controller 30) starts a connection with the personal digital assistant 200 (step S1204). When the connection request signal is not received (step S1203: No), the toilet device 100 (the controller 30) does not perform step S1204. That is, when the connection request signal is not received (step S1203: No), the toilet device 100 (the controller 30) does not start a connection with the personal digital assistant 200.

When set to the background active state, the personal digital assistant 200 determines whether or not the advertisement signal is received (step S1301). The personal digital assistant 200 repeats step S1301 until the advertisement signal is received (step S1301: No).

When the advertisement signal is received (step S1301: Yes), the personal digital assistant 200 determines whether or not the identification information included in the received advertisement signal matches the identification information of the personal digital assistant 200 (step S1302). That is, when receiving the advertisement signal (step S1301: Yes), the personal digital assistant 200 determines whether or not the toilet device 100 (the controller 30) is attempting to start a connection with the personal digital assistant 200.

When the identification information included in the received advertisement signal matches the identification information of the personal digital assistant 200 (step S1302: Yes), the personal digital assistant 200 transmits the connection request signal to the toilet device 100 (the controller 30) (step S1303) and starts the connection with the toilet device 100 (the controller 30) (step S1304).

When the identification information included in the received advertisement signal does not match the identification information of the personal digital assistant 200 (step S1302: No), the personal digital assistant 200 does not perform step S1303 and step S1304. That is, when the identification information included in the received advertisement signal does not match the identification information of the personal digital assistant 200 (step S1302: No), the personal digital assistant 200 does not transmit the connection request signal, and does not start the connection with the toilet device 100 (the controller 30).

Thus, when the user authentication is performed, the toilet device 100 (the controller 30) is enabled to transmit a signal for connecting with the personal digital assistant 200 having the identification information designated by the user authentication. The signal for connecting with the personal digital assistant 200 having the identification information designated by the user authentication is, for example, an advertisement signal that includes the identification information designated by the user authentication.

Also, for example, after the registration mode is performed, the toilet device 100 (the controller 30) may be enabled to transmit a signal for connecting with all of the personal digital assistants 200 including identification information stored in the storage part 50. The signal for connecting with all of the personal digital assistants 200 including the identification information stored in the storage part 50 is, for example, an advertisement signal that does not include identification information. The signal for connecting with all of the personal digital assistants 200 having the identification information stored in the storage part 50 may be, for example, an advertisement signal that includes identification information that includes all of the identification information stored in the storage part 50. For example, after the registration mode is performed, the toilet device 100 (the controller 30) may be enabled to transmit a signal for connecting with any multiple personal digital assistants 200 having the identification information.

For example, if the user authentication is not performed after the registration mode is performed, the toilet device 100 (the controller 30) would be enabled to transmit a signal for connecting with all of the personal digital assistants 200 having the identification information stored in the storage part 50.

Thus, when the user authentication is performed, by being enabled to transmit a signal for connecting with the personal digital assistant 200 having the identification information designated by the user authentication, the transmission of the biological information to a personal digital assistant 200 other than the personal digital assistant 200 of the user designated by the user authentication can be suppressed.

Also, after the registration mode is performed, by enabling to transmit a signal for connecting with all of the personal digital assistants 200 having the identification information stored in the storage part 50, the biological information also can be transmitted, if necessary, to personal digital assistants 200 other than the personal digital assistant 200 of the user designated by the user authentication.

Method for Controlling Toilet Device

The embodiment also provides a method for controlling the toilet device 100 that can be connected with the personal digital assistant 200 of a user by wireless communication. As illustrated in FIGS. 4 to 10, the method for controlling the toilet device according to the embodiment includes a registration process, a user authentication process, a measurement process, and a transmission process. The registration process is a process of associating identification information identifying the personal digital assistant 200 and user information identifying the user, and storing the identification information and the user information in the storage part 50. The user authentication process is performed after the registration process, and is a process of designating the user information and the identification information when an authentication signal is received. The measurement process is a process of measuring biological information of the user. The transmission process is performed after the measurement process, and is a process of transmitting the biological information to the personal digital assistant 200.

According to the method for controlling the toilet device according to the embodiment, when the transmission process is performed after the user authentication process, the biological information is transmitted to the personal digital assistant 200 having the identification information designated in the user authentication process.

Control Program of Toilet Device

The embodiment also provides a control program that is installed in the toilet device 100, which can be connected with the personal digital assistant 200 of the user by wireless communication. As illustrated in FIGS. 4 to 10, the control program of the toilet device according to the embodiment, when executed by a processor of the toilet device 100, causes the toilet device 100 to perform a registration process, a user authentication process, a measurement process, and a transmission process. The registration process is a process of associating identification information identifying the personal digital assistant 200 and user information identifying the user, and storing the identification information and the user information in the storage part 50. The user authentication process is performed after the registration process, and is a process of designating the user information and the identification information when an authentication signal is received. The measurement process is a process of measuring biological information of the user. The transmission process is performed after the measurement process, and is a process of transmitting the biological information to the personal digital assistant 200.

In the control program of the toilet device according to the embodiment, when the transmission process is performed after the user authentication process, the biological information is transmitted to the personal digital assistant 200 having the identification information designated in the user authentication process.

Recording Medium

According to an embodiment, a recording medium is provided in which the control program of the toilet device described above is recorded. The recording medium is at least computer-readable. The recording medium may be read-only or enabled for both reading and writing.

Thus, according to the method for controlling the toilet device, the control program of the toilet device, and the recording medium according to embodiments, when the transmission process is performed after the user authentication process, the transmission of the biological information to a personal digital assistant 200 other than the personal digital assistant 200 of the user designated by the user authentication can be suppressed by transmitting the biological information to the personal digital assistant 200 having the identification information designated in the user authentication process.

Embodiments may include the following configurations.

Configuration 1

A toilet device, comprising:

a biological information measurement sensor configured to measure biological information of a user;

a controller configured to transmit the biological information to a personal digital assistant of the user;

a wireless communication part configured to connect the controller and the personal digital assistant by wireless communication; and a storage part, the controller being configured to perform a registration mode of associating identification information identifying the personal digital assistant and user information identifying the user, and storing the identification information and the user information in the storage part, perform a user authentication of designating the user information and the identification information when receiving an authentication signal after performing the registration mode, and when the user authentication is performed, transmit a signal for connecting with the personal digital assistant having the identification information designated by the user authentication.

Configuration 2

The device according to configuration 1, further comprising:

a remote control configured to transmit the authentication signal.

Configuration 3

The device according to configuration 2, wherein the remote control includes an authentication switch used to transmit the authentication signal, the remote control selects the user information to be designated by the authentication signal based on a number of times that an operation input of the authentication switch is performed until a prescribed period has elapsed, and the remote control transmits the authentication signal when the prescribed period has elapsed.

Configuration 4

The device according to any one of configurations 1 to 3, wherein the controller is configured to transmit, after performing the registration mode, a signal for connecting with all of the personal digital assistants having the identification information stored in the storage part.

Configuration 5

A method for controlling a toilet device, the toilet device being connectable with a personal digital assistant of a user by wireless communication, the method comprising:

a registration process including associating identification information identifying the personal digital assistant and user information identifying the user, and storing the identification information and the user information in a storage part;

a user authentication process performed after the registration process is performed, the user authentication process designating the user information and the identification information when receiving an authentication signal;

a measurement process of measuring biological information of the user; and a transmission process performed after the measurement process, the transmission process transmitting the biological information to the personal digital assistant, when the transmission process is performed after the user authentication process, the biological information being transmitted to the personal digital assistant having the identification information designated in the user authentication process.

Configuration 6

A control program of a toilet device, the control program being installed in the toilet device, the toilet device being connectable with a personal digital assistant of a user by wireless communication, the control program, when executed by a processor of the toilet device, causing the toilet device to perform:

a registration process including associating identification information identifying the personal digital assistant and user information identifying the user, and storing the identification information and the user information in a storage part;

a user authentication process performed after the registration process, the user authentication process designating the user information and the identification information when receiving an authentication signal;

a measurement process of measuring biological information of the user; and a transmission process of transmitting the biological information to the personal digital assistant after the measurement process is performed, when the transmission process is performed after the user authentication process, the biological information being transmitted to the personal digital assistant having the identification information designated in the user authentication process.

Thus, according to embodiments, a toilet device, a method for controlling a toilet device, and a control program of a toilet device are provided in which the transmission of the biological information to a personal digital assistant other than the user's personal digital assistant can be suppressed.

The invention has been described with reference to the embodiments. However, the invention is not limited to these embodiments. Any design changes in the above embodiments suitably made by those skilled in the art are also encompassed within the scope of the invention as long as they fall within the spirit of the invention. For example, the shape, the size the material, the disposition and the arrangement or the like of the components included in the toilet device are not limited to illustrations and can be changed appropriately.

The components included in the embodiments described above can be combined to the extent possible, and these combinations are also encompassed within the scope of the invention as long as they include the features of the invention.

What is claimed is:

1. A toilet device, comprising:

a biological information measurement sensor configured to measure biological information of a user;

a controller configured to transmit the biological information to a personal digital assistant of the user;

a wireless communication part configured to connect the controller and the personal digital assistant by wireless communication; and a storage part, the controller being configured to perform a registration mode of associating identification information identifying the personal digital assistant and user information identifying the user, and storing the identification information and the user information in the storage part, perform a user authentication of designating the user information and the identification information when receiving an authentication signal after performing the registration mode, and when the user authentication is performed, determine the personal digital assistant having the identification information identified by the user authentication, and transmit a signal for connecting with the determined personal digital assistant.

2. The device according to claim 1, further comprising:

a remote control configured to transmit the authentication signal.

3. The device according to claim 2, wherein the remote control includes an authentication switch used to transmit the authentication signal, the remote control selects the user information to be designated by the authentication signal based on a number of times that an operation input of the authentication switch is performed until a prescribed period has elapsed, and the remote control transmits the authentication signal when the prescribed period has elapsed.

4. The device according to claim 1, wherein the controller is configured to transmit, after performing the registration mode, a signal for connecting with all of the personal digital assistants having the identification information stored in the storage part.

5. A method for controlling a toilet device, the toilet device being connectable with a personal digital assistant of a user by wireless communication, the method comprising:

a registration process including associating identification information identifying the personal digital assistant and user information identifying the user, and storing the identification information and the user information in a storage part;

a user authentication process performed after the registration process is performed, the user authentication process designating the user information and the identification information when receiving an authentication signal;

a measurement process of measuring biological information of the user; and a transmission process performed after the measurement process, the transmission process transmitting the biological information to the personal digital assistant, when the transmission process is performed after the user authentication process, the personal digital assistant having the identification information identified by the user authentication being determined, and the biological information being transmitted to the personal digital assistant.

6. A control program of a toilet device, the control program being installed in the toilet device, the toilet device being connectable with a personal digital assistant of a user by wireless communication, the control program, when executed by a processor of the toilet device, causing the toilet device to perform:

a registration process including associating identification information identifying the personal digital assistant and user information identifying the user, and storing the identification information and the user information in a storage part;

a user authentication process performed after the registration process, the user authentication process designating the user information and the identification information when receiving an authentication signal;

a measurement process of measuring biological information of the user; and a transmission process of transmitting the biological information to the personal digital assistant after the measurement process is performed, when the transmission process is performed after the user authentication process, the personal digital assistant having the identification information identified by the user authentication being determined, and the biological information being transmitted to the personal digital assistant.

* * * * *